US007890121B2

(12) United States Patent
Matsubara

(10) Patent No.: US 7,890,121 B2
(45) Date of Patent: Feb. 15, 2011

(54) POSITION MEASUREMENT SYSTEM AND PORTABLE TERMINAL

(75) Inventor: Hiroki Matsubara, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 795 days.

(21) Appl. No.: 11/843,062

(22) Filed: Aug. 22, 2007

(65) Prior Publication Data

US 2008/0051102 A1 Feb. 28, 2008

(30) Foreign Application Priority Data

Aug. 25, 2006 (JP) .............................. 2006-229472

(51) Int. Cl.
*H04Q 7/20* (2006.01)
(52) U.S. Cl. ................. 455/456.1; 455/456.3; 455/457; 455/550.1
(58) Field of Classification Search .............. 455/456.1, 455/456.3, 456.6, 457, 404.2, 403, 550.1
See application file for complete search history.

(56) References Cited

U.S. PATENT DOCUMENTS

| 6,768,450 | B1 | 7/2004 | Walters et al. |
| 6,959,207 | B2 * | 10/2005 | Keinonen et al. ........... 455/567 |
| 7,450,163 | B2 * | 11/2008 | Rothschild ............... 348/231.2 |
| 2001/0048746 | A1 | 12/2001 | Dooley |
| 2002/0085111 | A1 | 7/2002 | Heiman |
| 2002/0145560 | A1 | 10/2002 | Tsujimoto |
| 2003/0073447 | A1 | 4/2003 | Ogaki et al. |
| 2005/0186965 | A1 | 8/2005 | Pagonis et al. |
| 2006/0148486 | A1 * | 7/2006 | Kim et al. ................ 455/456.1 |

FOREIGN PATENT DOCUMENTS

| JP | 2001211472 | 8/2001 |
| JP | 2003209886 | 7/2003 |
| JP | 2004032325 | 1/2004 |
| JP | 2005202397 | 7/2005 |
| JP | 2005528049 | 9/2005 |
| WO | 03101139 A1 | 12/2003 |
| WO | 2006043123 A1 | 4/2006 |
| WO | 2006099998 A1 | 9/2006 |

OTHER PUBLICATIONS

European Search Report dated Apr. 22, 2009 for Appln. No. 07016385.2.
Japanese Office Action with English transaction, dated Jul. 22, 2008, for corresponding foreign application, 5 pp.

* cited by examiner

*Primary Examiner*—CongVan Tran
(74) *Attorney, Agent, or Firm*—Pillsbury Winthrop Shaw Pittman, LLP

(57) ABSTRACT

A first portable terminal receives a GPS signal transmitted from a satellite via radio waves with a signal reception means, and a short distance wireless communication means transfers this received signal to a second portable terminal. Furthermore, upon receipt of this signal transferred from the first portable terminal, the second portable terminal processes the received signal with a position measurement means, and thereby measures the position of the first portable terminal. Since the communication between the first portable terminal and the second portable terminal is by short distance wireless communication, accordingly these two portable terminals are positioned approximately at the same location. And a position measurement result notification means of the second portable terminal notifies its own position, which the position measurement means has acquired, to the first portable terminal.

4 Claims, 11 Drawing Sheets

POSITION MEASUREMENT SYSTEM AND PORTABLE TERMINAL

CROSS REFERENCE

This Nonprovisional application claims priority under 35 U.S.C. §119(a) on Patent Application No. 2006-229472 filed in Japan on Aug. 25, 2006, the entire contents of which are hereby incorporated by reference.

BACKGROUND OF THE INVENTION

The present invention relates to a position measurement system which measures the current position by employing the GPS (Global Positioning System), and to a portable terminal which utilizes this position measurement system.

In the prior art, devices have been implemented in practice which perform measurement of the current position by employing GPS. As is per se well known, this position measurement by GPS is a method by which a device (a receiver) receives GPS signals emitted from at least three satellites, and calculates its own position using these GPS signals. In concrete terms, each of the satellites emits, in its GPS signal, radio waves upon which are superimposed almanac data which is information specifying the orbit of the satellite, and ephemeris data which specifies detailed starting information for the satellite and the time instant that the signal was emitted. And the measurement of the position of the receiver is performed by a triangle intersection method, using the calculated distances from the receiver of the three satellites whose GPS signals have been received.

Furthermore, as disclosed in Japanese Laid-Open Patent Publication 2005-202397 and Japanese Patent 3,671,795 etc., a practical implementation has been made of a mobile telephone endowed with GPS functionality, this telephone being provided with a GPS reception unit which receives GPS signals emitted from the GPS satellites, and measuring its own position using these GPS signals. A typical mobile telephone endowed with GPS functionality is not actually provided with the function of itself processing the GPS signals received from the GPS satellites by its GPS reception unit so as to measure its own position; rather, it transmits the GPS signals which it has received from the GPS satellites to a center. And, using these GPS signals which have been transmitted from this mobile telephone endowed with GPS functionality, the center performs a position measurement calculation in order to determine the position of said mobile telephone endowed with GPS functionality, and then returns the result of this calculation, which is the result of positional measurement, back to said mobile telephone endowed with GPS functionality. And the mobile telephone endowed with GPS functionality acquires its own position by receiving this result of position measurement from the center. This method is generally termed the MS-Assisted mode.

Furthermore, a mobile telephone endowed with GPS functionality has also been proposed (for example, in Japanese Patent Publication 2005-528049), which is endowed with a short distance wireless communication function such as BlueTooth (a trademark) or Zigbee or the like, and which notifies its own position to some other portable terminal, for example a digital camera, with this short distance wireless communication function. By doing this the portable terminal, which itself is not endowed with any position measurement function by GPS, can also acquire its own position, and can use it. For example, in the case of a digital camera, it may take the position which it has thus acquired with this short distance wireless communication with the mobile telephone endowed with GPS functionality as the position at which it has captured an image, and may append this position in correspondence with the data for the captured image. By doing this, each captured image is associated with the location where that image was captured, and accordingly it is possible to assist the user with management of captured images.

However, such a mobile telephone endowed with GPS functionality which operates according to the MS-Assisted mode transmits the GPS signals which it has received from the satellites to the center via the mobile telephone network. Due to this, when the mobile telephone endowed with GPS functionality is positioned at a location in which it cannot connect to the mobile telephone network, i.e. is in a no-service area, it cannot transmit the GPS signals which it has received from the satellites to the center. Accordingly, with a prior art type of mobile telephone endowed with GPS functionality, there has been the problem that, when this mobile telephone is located in a no-service area, it is unable to measure its own position using GPS. Furthermore, since it is not possible for this mobile telephone endowed with GPS functionality to acquire its own position, accordingly, some other terminal which attempts to acquire its own position by short distance communication with this mobile telephone endowed with GPS functionality cannot acquire its own position either. In other words, with the structure disclosed in Japanese Patent Publication 2005-528049, when the mobile telephone endowed with GPS functionality is positioned in a no-service area, neither of the devices is able to utilize its own position which has been measured using GPS.

The objective of the present invention is to provide a position measurement system which is capable of acquiring a position measurement result using GPS, even in a state in which when a portable terminal thereof whose method of measuring its own position is the MS-Assisted mode cannot connect to a center, and moreover with which this result of position measurement can be utilized by another portable terminal; and to provide said other portable terminal which is applied in this position measurement system.

SUMMARY OF THE INVENTION

With the present invention, a first portable terminal receives a signal—a so called GPS signal—transmitted from a satellite via radio waves with a signal reception means, and transfers this signal which it has received to a second portable terminal, using a short distance wireless communication means such as BlueTooth (a trademark), ZigBee, or the like. This signal includes almanac data, which is information specifying the orbit of the satellite, and ephemeris data, which specifies the position of the satellite and the time instant of origination of the signal. Furthermore, when the second portable terminal receives this signal which has been transferred from the first portable terminal, it processes this signal which it has received with a position measurement means, and thereby measures the position of the first portable terminal. Due to the fact that, as described above, the communication between the first portable terminal and the second portable terminal is performed by short distance wireless communication, these two portable terminals are positioned at approximately the same location. Accordingly, by performing the processing described above, the second portable terminal is able to acquire its own position. Furthermore, a position measurement result notification means of the second portable terminal notifies the position of the first portable terminal, which it has acquired by the processing described above, to the first portable terminal, by taking advantage of the short distance wireless communication means. Accordingly, the first portable terminal is also able to acquire its own position.

Furthermore, if the first portable terminal is a mobile telephone endowed with GPS functionality, which is equipped with a position measurement function with GPS which operates by GPS in the MS-Assisted mode, then, even when this mobile telephone is located in a no-service area in which it cannot connect to any mobile telephone network, it is able to obtain a position measurement result by GPS, if such a second portable terminal is present within the communication area for short distance wireless communication. Moreover, the second portable terminal is able to acquire its own position, irrespective of whether or not the mobile telephone, which is the first portable terminal, is located in a no-service area.

Yet further, if the first portable terminal is a mobile telephone endowed with GPS functionality, which is equipped with a position measurement function with GPS which operates by GPS in the MS-Based mode, then it will be acceptable to provide, to this first portable terminal, a position measurement result notification means by which the first portable terminal, which has measured its own position, notifies this position to the second portable terminal.

Even further, the portable terminal according to this invention is the second portable terminal in the above described position measurement system.

DETAILED DESCRIPTION OF THE INVENTION

Figure 1:
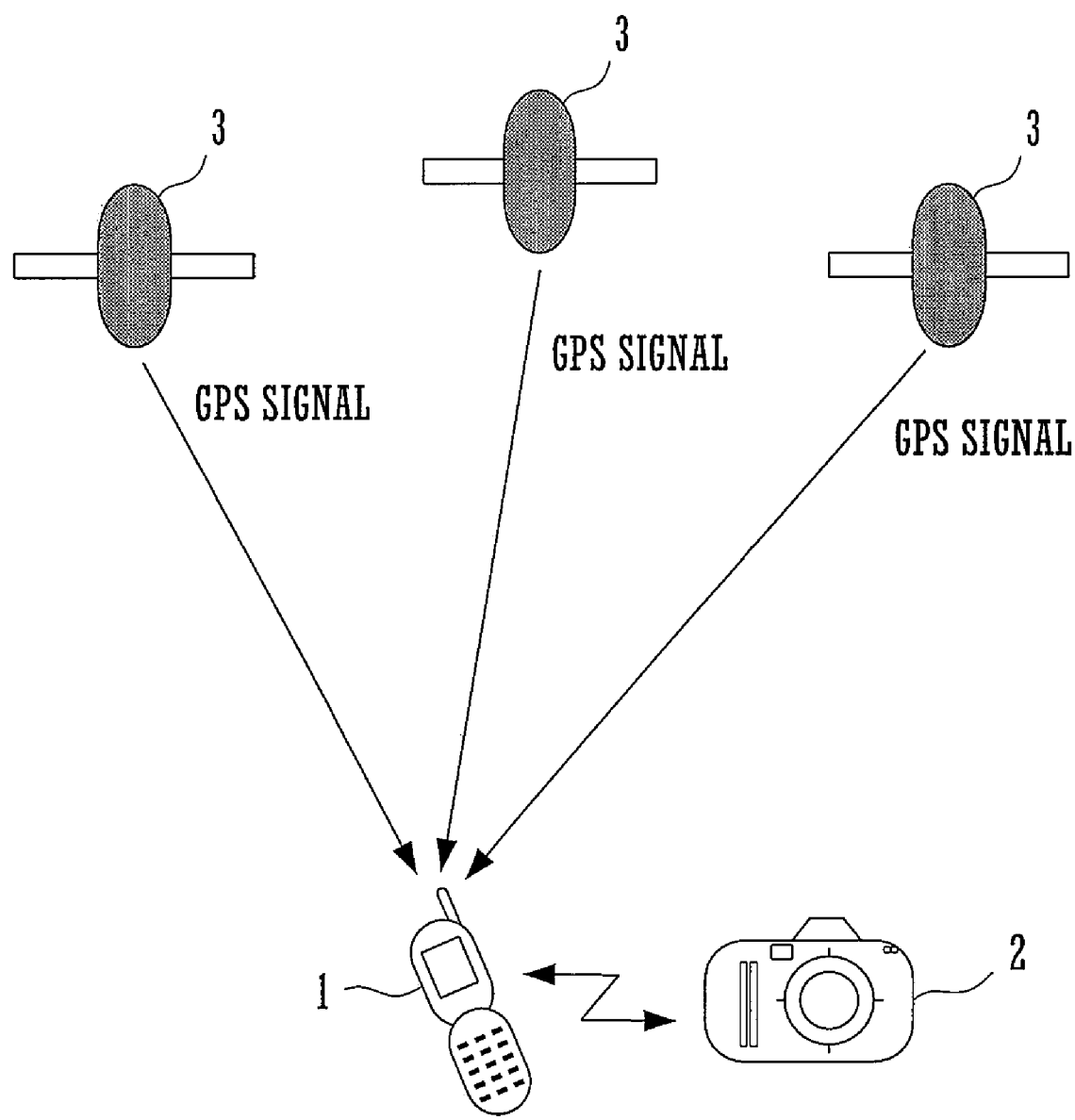
FIG. 1 is a schematic figure showing a position measurement system which is an embodiment of the present invention.

FIG. 1 is a schematic figure showing a position measurement system which is an embodiment of the present invention. This position measurement system according to the present invention comprises a mobile telephone 1 and a digital camera 2. The mobile telephone 1 corresponds to the "first portable terminal" of the Claims, while the digital camera 2 corresponds to the "second portable terminal" of the Claims. Furthermore, the reference symbols 3 shown in FIG. 1 denote GPS satellites. In FIG. 1, three GPS satellites 3 are shown. The mobile telephone 1 is a so called mobile telephone endowed with GPS functionality, which comprises a GPS reception unit which receives GPS signals transmitted from these GPS satellites 3. These GPS signals include almanac data, which is information specifying the orbit of the satellite, and ephemeris data, which specifies the position of the satellite and the time instant of origination of the signal. Furthermore, the mobile telephone 1 and the digital camera 2 are adapted so as to be able to perform mutual communication by short distance wireless communication, for example by Bluetooth (a trademark) or ZigBee or the like. In this embodiment, the mobile telephone 1 is a mobile telephone endowed with GPS functionality which operates in the MS-Assisted mode.

It should be understood that it would also be acceptable to arrange for the short distance wireless communication between the mobile telephone 1 and the digital camera 2 to be performed by infrared communication using Ir-DA.

Figure 2:
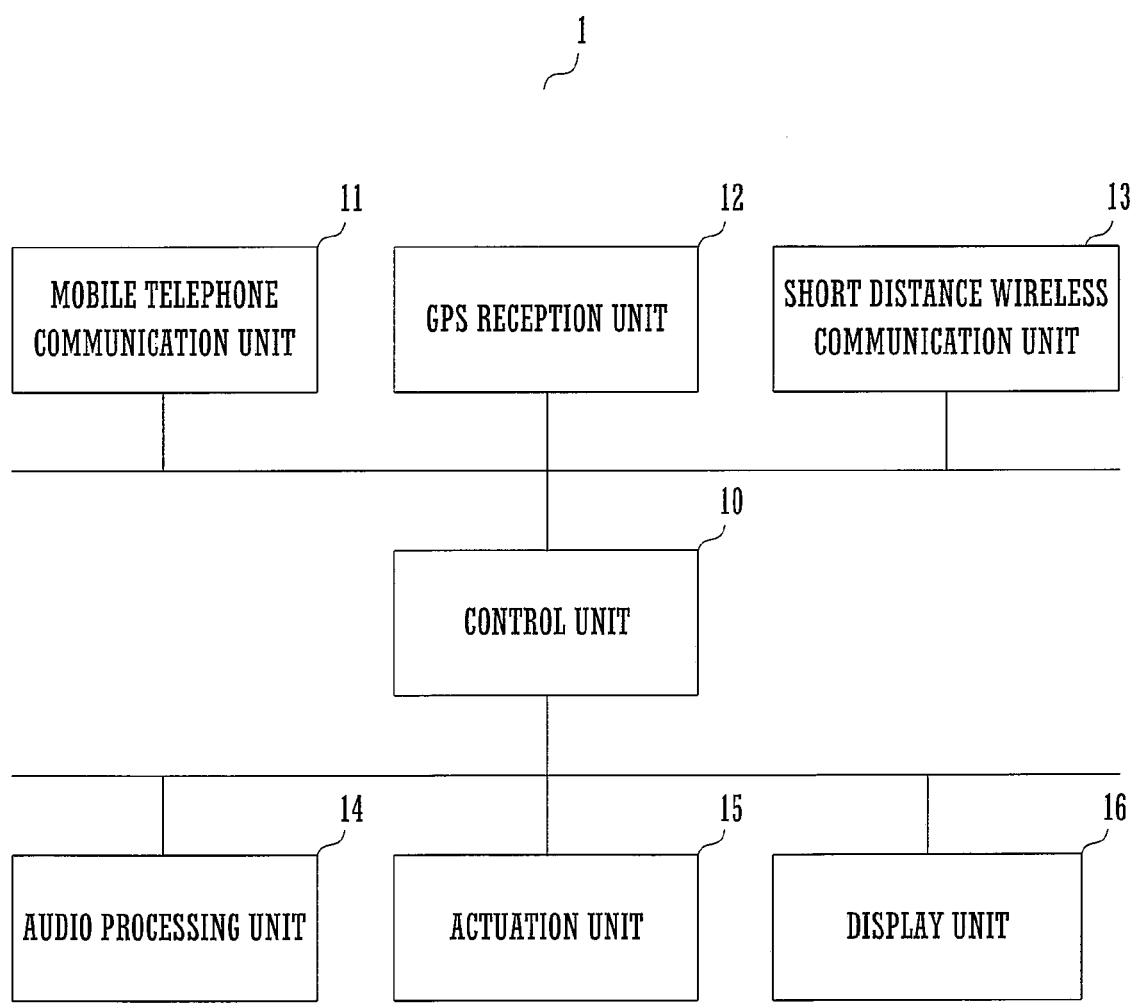
FIG. 2 is a figure showing the principal structure of a mobile telephone which is employed in this position measurement system according to an embodiment of the present invention.

FIG. 2 is a figure showing the principal structure of this mobile telephone employed in the position measurement system according to this embodiment of the present invention. This mobile telephone 1 comprises a control unit 10, a mobile telephone communication unit 11, a GPS reception unit 12, a short distance wireless communication unit 13, an audio processing unit 14, an actuation unit 15, and a display unit 16. The control unit 10 controls the operation of the main sections of the mobile telephone. The mobile telephone communication unit 11 communicates with a terminal, such as another mobile telephone or the like, via a mobile telephone network not shown in the figures. The GPS reception unit 12 receives the GPS signals emitted by the GPS satellites 3. The short distance wireless communication unit 13 performs short distance wireless communication. The audio processing unit 14 performs processing of input and output audio during audio communication with another terminal using the mobile telephone communication unit 11. The actuation unit 15 receives input actuation for the device as a whole. And the display unit 16 displays the operational state of the device as a whole, and so on.

In hardware terms, this mobile telephone 1 consists of a per se known mobile telephone endowed with GPS functionality which operates in the MS-Assisted mode, but with the short distance wireless communication unit 13 appended. This short distance wireless communication unit 13 is provided in order to perform short distance wireless communication with the digital camera 2. Furthermore, this mobile telephone 1 transmits the GPS signals which it has received with the GPS reception unit 12 to a center not shown in the figure, and acquires its own position by receiving the results of position measurement from the center. The mobile telephone 1 performs communication with the center by using the mobile telephone communication unit 11. Moreover, the mobile telephone 1 transmits the GPS signals which it has received from the GPS satellite 3 with the GPS reception unit 12 to the digital camera 2, using the short distance wireless communication unit 13. Yet further, using the short distance wireless communication unit 13, the mobile telephone 1 receives position measurement results which have been transmitted from the digital camera 2.

Figure 3:
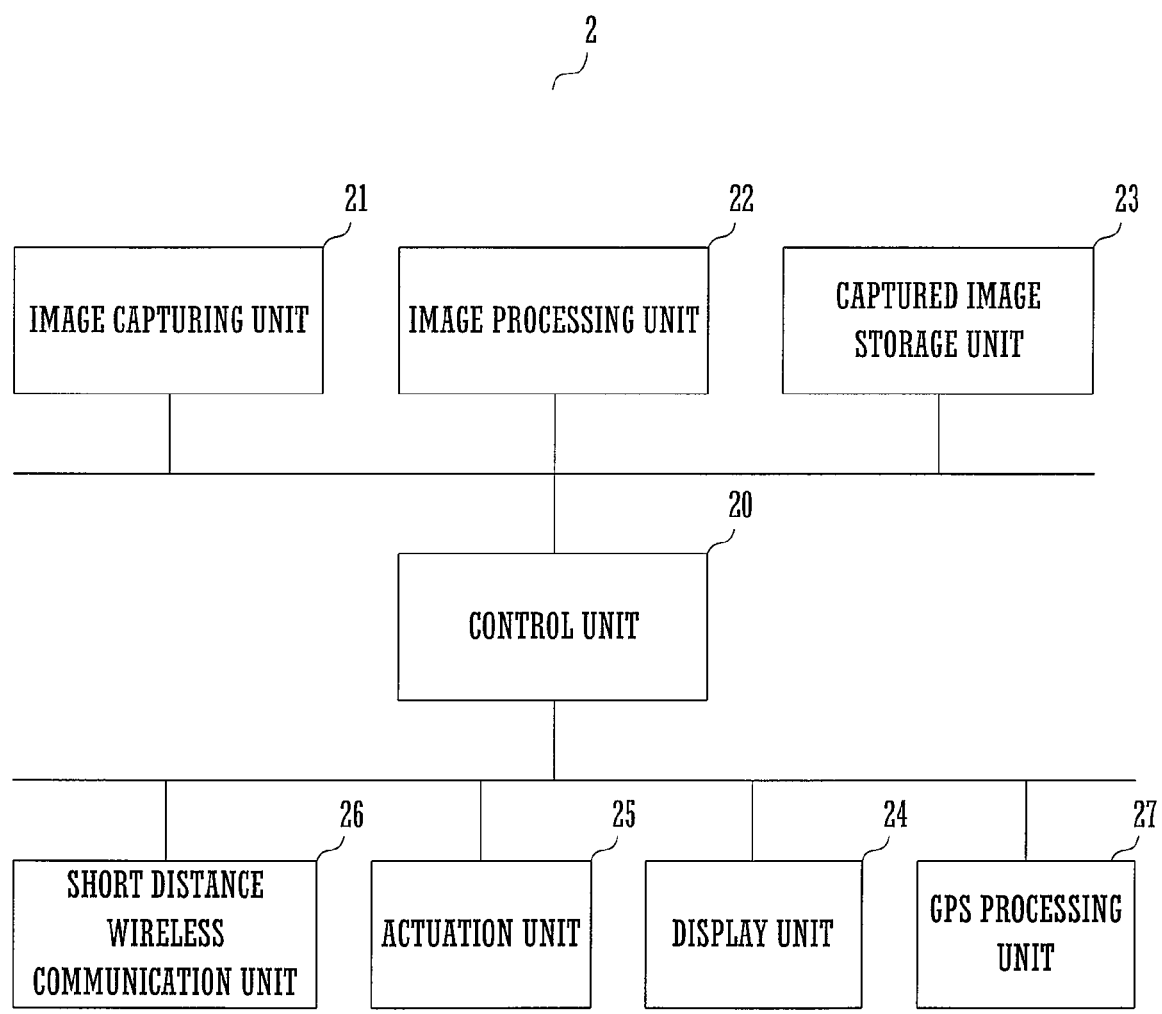
FIG. 3 is a figure showing the principal structure of a digital camera which is employed in this position measurement system according to an embodiment of the present invention.

FIG. 3 is a figure showing the principal structure of this digital camera 2, which is an embodiment of the present invention. This digital camera 2 comprises a control unit 20, an image capturing unit 21, an image processing unit 22, a captured image storage unit 23, a display unit 24, an actuation unit 25, a short distance wireless communication unit 26, and a GPS processing unit 27. The control unit 20 controls the overall operation of this digital camera 2. The image capturing unit 21 captures an image. The image processing unit 22 processes an image which has been captured by the image capturing unit 21. The captured image storage unit 23 stores a captured image. The display unit 24 displays a viewfinder image or the like. On the actuation unit 25, input actuation for the main body of the device is performed. The short distance wireless communication unit 26 performs short distance wireless communication. And the GPS processing unit 27 performs position measurement by processing the almanac data and ephemeris data contained in the GPS signals.

In hardware terms, this digital camera 2 consists of a per se known type of digital camera, but with the short distance wireless communication unit 26 and the GPS processing unit 27 appended. This short distance wireless communication unit 26 is a structure for performing short distance wireless communication with the mobile telephone 1. Furthermore, the GPS processing unit 27 is a structure which processes the GPS signals which are acquired from the mobile telephone 1, and which performs position measurement processing for measuring the position of this mobile telephone 1. The digital camera 2 notifies the position which it has obtained by this position measurement processing (the position of the mobile telephone 1) to the mobile telephone 1. This notification is also performed by short distance wireless communication. Since, as described above, the mobile telephone 1 and the digital camera 2 communicate by short distance wireless communication, accordingly the position of the mobile telephone 1 and the position of the digital camera 2 are approximately the same position. Thus, the digital camera 2 also takes advantage of the position of the mobile telephone 1, which it has obtained by the above described position measurement processing, as being its own position. In concrete terms, the digital camera 2 is endowed with a function of storing a captured image, and the position at which this captured image was captured (hereinafter this will be termed the "image capture position") in mutual correspondence in the captured image storage unit 23. This image capture position is the position of the mobile telephone 1 which has been acquired by the GPS processing unit 27 during the position measurement processing.

It should be understood that this mobile telephone 1 is also able to transmit the GPS signals which it has received to a center, and to obtain a position measurement result from the center. Furthermore, this digital camera 2 is also able to request the mobile telephone 1 to transfer the position measurement result which it has acquired from the center (i.e. the position of this mobile telephone 1), and thus to acquire this position measurement result. The communication between the mobile telephone 1 and the digital camera 2 at this time is, again, performed by short distance wireless communication.

In the following, the operation of this position measurement system according to an embodiment of the present invention will be explained.

The mobile telephone 1 is able to operate in a first mode in which the GPS function is OFF, in a second mode in which it performs position measurement of its own position in the MS-Assisted mode, and in a third mode in which it performs position measurement of its own position in cooperation with the digital camera 2. With regard to the first mode and the second mode, since they are the same as in the case of a per se known mobile telephone endowed with GPS functionality which operates in the MS-Assisted mode, explanation thereof will herein be omitted. The changing over between the first mode, the second mode, and the third mode is performed by key actuation upon the actuation unit 15. On the other hand, the digital camera 2 is able to operate in an A mode in which, in cooperation with the mobile telephone 1, the GPS function of performing position measurement of the position of this mobile telephone 1 is OFF, and in a B mode in which, in cooperation with the mobile telephone 1, the GPS function of performing position measurement of the position of this mobile telephone 1 is ON. The changing over between the A mode and the B mode is performed by key actuation upon the actuation unit 25. Furthermore, with regard to capturing of an image by the image capturing unit 21 of the digital camera 2, this is performed by actuation of the shutter button, irrespective of whether the digital camera 2 is in the A mode or in the B mode. With regard to the A mode, since it is the same as in the case of a per se known digital camera, explanation thereof will herein be omitted.

Figure 4:
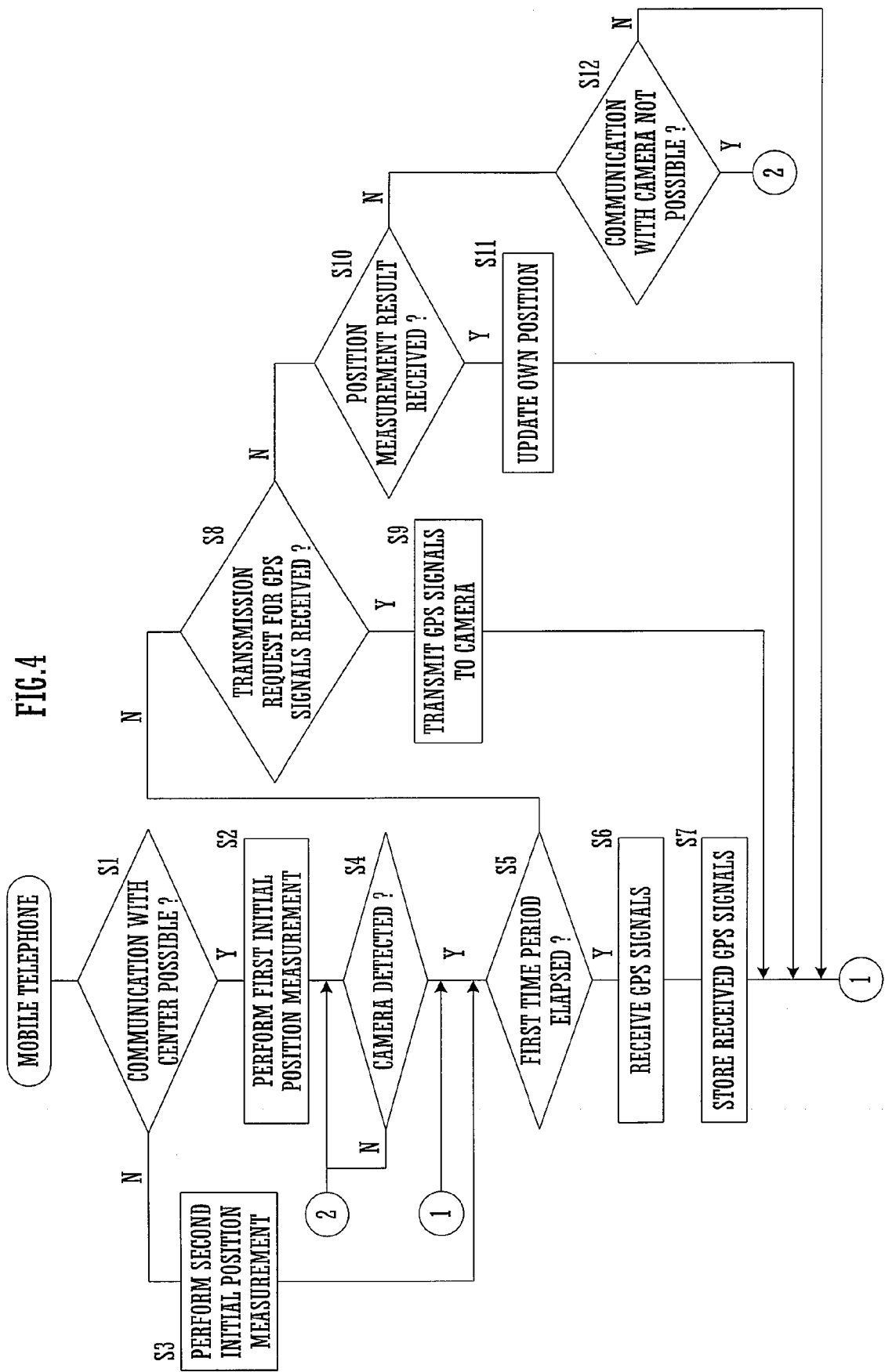
FIG. 4 is a flow chart showing the operation of this mobile telephone of the position measurement system of this embodiment in a third mode thereof.
Figure 5:
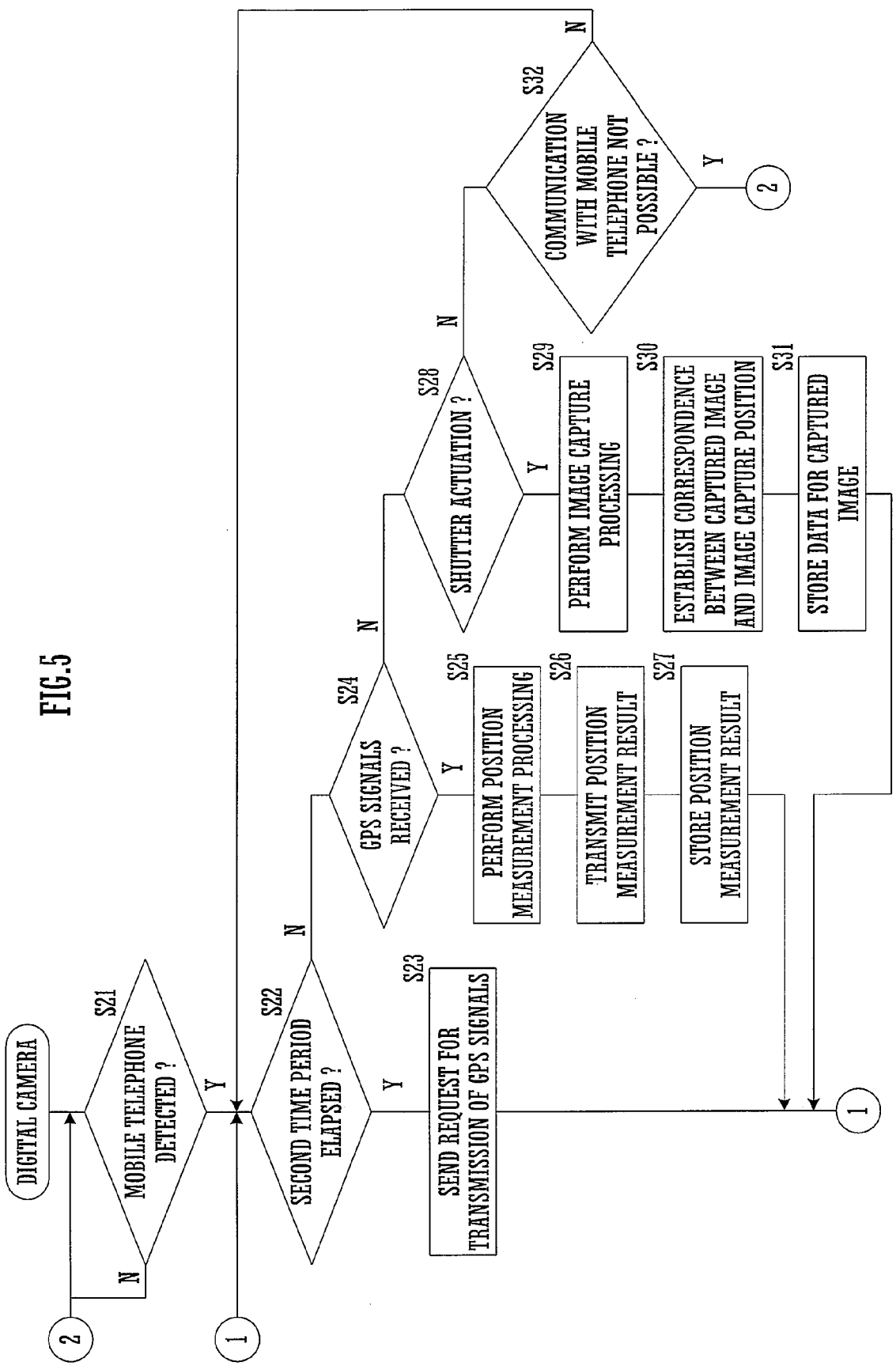
FIG. 5 is a flow chart showing the operation of this digital camera of the position measurement system of this embodiment in a B mode thereof.

FIG. 4 is a flow chart showing the operation of this mobile telephone 1 of the position measurement system according to this embodiment in its third mode, and FIG. 5 is a flow chart showing the operation of this digital camera 2 of the position measurement system according to this embodiment in its B mode. When actuation of the mobile telephone 1 to change it over to its third mode is performed upon the actuation unit 15, then the processing shown in FIG. 4 is started. And when, during the execution of the processing shown in FIG. 4, actuation of the mobile telephone 1 to change it over to some other mode is performed upon the actuation unit 15, then the processing shown in FIG. 4 is stopped, and operation in the mode to which changing over has been performed is started. Furthermore, when actuation of the digital camera 2 to change it over to its B mode is performed upon the actuation unit 25, then the processing shown in FIG. 5 is started. And, when during the execution of the processing shown in FIG. 5, actuation of the digital camera 2 to change it over to some other mode is performed upon the actuation unit 25, then the processing shown in FIG. 5 is stopped, and operation in the mode to which changing over has been performed is started.

When its operation in its third mode starts, the mobile telephone 1 first, initially, makes a decision whether or not communication with the center is possible (a step S1). This communication with the center is performed via the mobile telephone communication unit 11. Accordingly, the mobile telephone 1 is not able to communication with the center, when it is in a location in which it cannot connect to the mobile telephone network (not shown in the figures), i.e. when it is in a so-called no-service area. When the mobile telephone 1 decides in this step S1 that it can communicate with the center, then it acquires its own position by taking advantage of the center, and thus performs a first initial position measurement (a step S2). On the other hand, if in the step S1 it is decided that communication with the center is not possible, then the mobile telephone 1 acquires its own position by taking advantage of the digital camera 2, and thus performs a second initial position measurement (a step S3). The processing performed in the steps S2 and S3 is processing for the mobile telephone 1, along with acquiring its own position, also to acquire valid almanac data, which is orbital information for the GPS satellites 3. The processing performed in these steps S2 and S3 will be described in detail hereinafter.

When the first initial position measurement in the step S2 is completed, then, via the short distance wireless communication unit 13, the mobile telephone 1 looks for a digital camera 2 of a type in cooperation with which position measurement of its own position can be performed (a step S4). Here, the mobile telephone 1 looks for a digital camera 2 in cooperation with which position measurement of its own position can be performed, which is positioned within the communication area of the short distance wireless communication unit 13. In other words, the mobile telephone 1 looks for a digital camera 2 which can perform short distance wireless communication with the short distance wireless communication unit 13.

It should be understood that, in the processing for second initial position measurement, the mobile telephone 1 looks for a digital camera 2 of a type in cooperation with which position measurement of its own position can be performed. Accordingly, if the mobile telephone 1 has performed the second initial position measurement of the step S3, then the processing of this step S4 is not executed.

Furthermore, if the mobile telephone 1 cannot detect any digital camera 2 of a type in cooperation with which position measurement of its own position can be performed, then the processing of the step S4 is repeated at a predetermined time interval which is specified in advance.

When the processing for the second initial position measurement in the step S3 has been completed, or when a digital camera 2 in cooperation with which position measurement of its own position can be performed is detected in the step S4, then the mobile telephone 1 starts processing to receive the GPS signals which are being emitted from the GPS satellites 3 repeatedly, each time a first time period which is determined in advance elapses (steps S5 and S6). The mobile telephone 1 receives the GPS signals via the GPS reception unit 12. When the mobile telephone 1 receives the GPS signals in the step S6, it stores these GPS signals which it has received (a step S7). The GPS signals are stored in a memory provided to the control unit 10, not shown in the figures. Furthermore when, while the mobile telephone 1 is performing the processing of the steps S5 through S7, a transmission request for the GPS signals is received from the digital camera 2 by the short distance wireless communication unit 13, then it transmits the newest GPS signals which it has stored in the memory to the digital camera 2 which has transmitted this request for transmission thereof (steps S8 and S9). This receipt of a request for transmission of the GPS signals, and the transmission of the GPS signals, are both performed via the short distance wireless communication unit 13. Furthermore, when the mobile telephone 1 receives the result of position measurement of its own position which has been transmitted from the digital camera 2 via the short distance wireless communication unit 13, then it updates its own position in storage (steps S10 and S11). The processing performed in these steps S10 and S11 may also be performed while the processing of the steps S5 through S7 is being executed. Moreover, if a state comes to hold in which the mobile telephone 1 is not able to perform short distance communication with the digital camera 2 via the short distance wireless communication unit 13 (a step S12), then the flow of control returns to the step S4 and the processing described above is repeated.

It should be understood that, while this mobile telephone 1 is operating in this third mode as well, it is still capable of communicating with other terminals upon the mobile telephone network, via the mobile telephone communication unit 11. Moreover, if actuation is performed via the actuation unit 15 to change the mobile telephone 1 over to some other mode, or if actuation is performed to turn OFF the power supply to the mobile telephone 1 or the like, then the processing shown in this FIG. 4 terminates, and operation in the mode to which changeover has been performed is started.

Next, the operation of the digital camera 2 in its B mode will be explained with reference to FIG. 5. When the digital camera 2 starts its operation in its B mode, it searches, using the short distance wireless communication unit 26, for a mobile telephone 1 of a type in cooperation with which position measurement of its own position can be performed (a step S21). The digital camera 2 acquires the position of the mobile telephone 1, which it considers as being substantially its own position. When the digital camera 2 is able to establish short distance wireless communication via the short distance wireless communication unit 26 with the mobile telephone 1, then it decides that it has detected a mobile telephone 1 of a type in cooperation with which it can perform position measurement of its own position. To put it in another manner, when the mobile telephone 1 described above is able to establish short distance wireless communication via the short distance wireless communication unit 13 with the digital camera 2, then it decides that it has detected a digital camera 2 of a type in cooperation with which it can perform position measurement of its own position.

It should be understood that, if in the step S21 the digital camera 2 is not able to detect a mobile telephone 1 in cooperation with which it can perform position measurement of its own position, then the processing of the step S21 is repeated at predetermined time intervals which are determined in advance. Moreover, during this processing, the digital camera 2 is also able to capture an image with the image capturing unit 21, to process this captured image with the captured image processing unit 22, and to store this captured image in the captured image storage unit 23.

When in the step S21 the digital camera 2 detects a mobile telephone 1 in cooperation with which it can perform position measurement of its own position, then via the short distance wireless communication unit 26 it repeatedly requests the mobile telephone 1 to transmit GPS signals, at intervals of a second time period which is determined in advance (steps S22 and S23). This second time period may be set to be the same time period as the first time period described above, or also may be a different time period. However, it is desirable for this second time period to be set to be greater than or equal to the first time period, in order to prevent the digital camera 2 from performing useless position measurement processing (i.e. position measurement processing upon the same GPS signals). The mobile telephone 1 receives the request for transmission of GPS signals which has been outputted by the digital camera 2 in this step S23, in the step S8 described above.

Furthermore when, while the digital camera 2 is executing the processing of the steps S22 and S23, it receives via the short distance wireless communication unit 26 the GPS signals which have been transmitted from the mobile telephone 1 (a step S24), then it processes these GPS signals which it has received with the GPS processing unit 27, and performs position measurement processing for calculating the position of the mobile telephone 1 (a step S25). Since the processing in this step S25 is position measurement processing according to a per se known triangle intersection method using the GPS signals, accordingly the details thereof will herein be omitted. When the digital camera 2 has calculated the position of the mobile telephone 1 in the step S25, it transmits the position which it has calculated at this time to the mobile telephone 1 as the result of position measurement (a step S26). Furthermore, it stores the position which it has calculated at this time in the memory of the control unit 20 as its own position (a step S27).

Furthermore, when the shutter button (not shown in the figures) which is provided to the actuation unit 25 is actuated (a step S28), then the digital camera 2 inputs an image which is captured by the image capturing unit 21 at this time point to the image processing unit 22 (a step S29). And the digital camera 2 establishes a correspondence between this captured image which it has inputted in the step S29 and its own most recent position which is stored at this time point (a step S30), and stores this in the captured image storage unit 23 (a step S31). Furthermore, if a state comes to hold in which the digital camera 2 is not able to perform short distance wireless communication with the mobile telephone 1 via the short distance wireless communication unit 26 (a step S32), then the flow of control returns to the step S21 and the processing described above is repeated.

It should be understood that if actuation is performed via the actuation unit 25 to change the digital camera 2 over to some other mode, or if actuation is performed to turn OFF the power supply to the digital camera 2 or the like, then the processing shown in this FIG. 5 terminates, and operation in the mode to which changeover has been performed is started.

Figure 6:
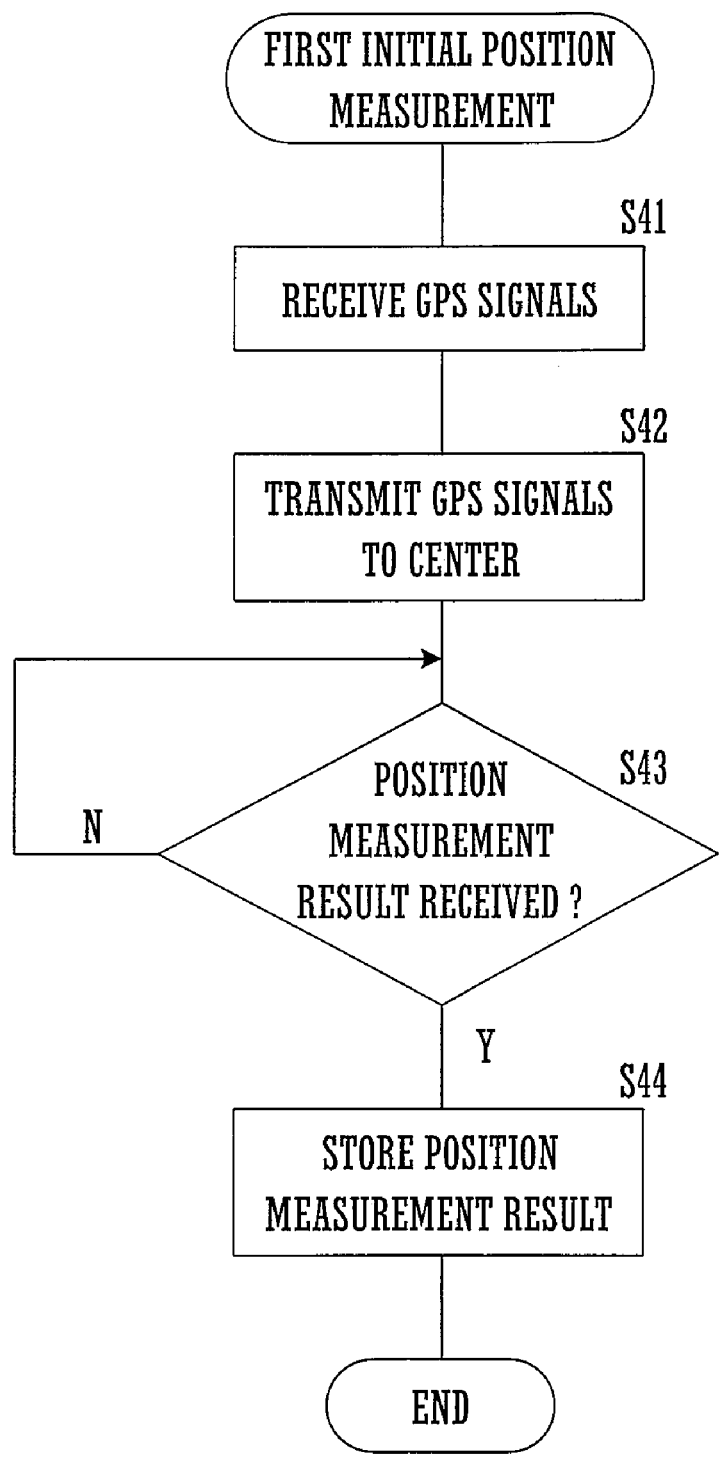
FIG. 6 is a flow chart showing a first initial position measurement by this mobile telephone of the position measurement system of this embodiment.

Next, the operation performed by the mobile telephone 1 for the first initial position measurement in the step S2 will be explained in detail. FIG. 6 is a flow chart showing the flow of control for this first initial position measurement. The mobile telephone 1 receives GPS signals which are emitted from the GPS satellites 3 with the GPS reception unit 12 (a step S41), and transmits these GPS signals which it has received to the center (a step S42). In the step S42, the mobile telephone 1 transmits the GPS signals which it has received this time to the center using the mobile telephone communication unit 11. And, after the GPS signals have been transmitted to the center in the step S42, when the mobile telephone 1 receives from the center with the mobile telephone communication unit 11 the result of position measurement which indicates its own position (a step S43), then it stores its own position based upon this position measurement result which it has thus received (a step S44), and then this processing ends.

It should be understood that, in this first initial position measurement, if the almanac data and ephemeris data which are stored in the main body of the mobile telephone 1 require to be updated, then the mobile telephone 1 updates this data. Furthermore, according to requirements, the mobile telephone 1 may transmit the almanac data and ephemeris data which are stored in its own main body to the digital camera 2, by utilizing the short distance wireless communication unit 13.

Figure 7:
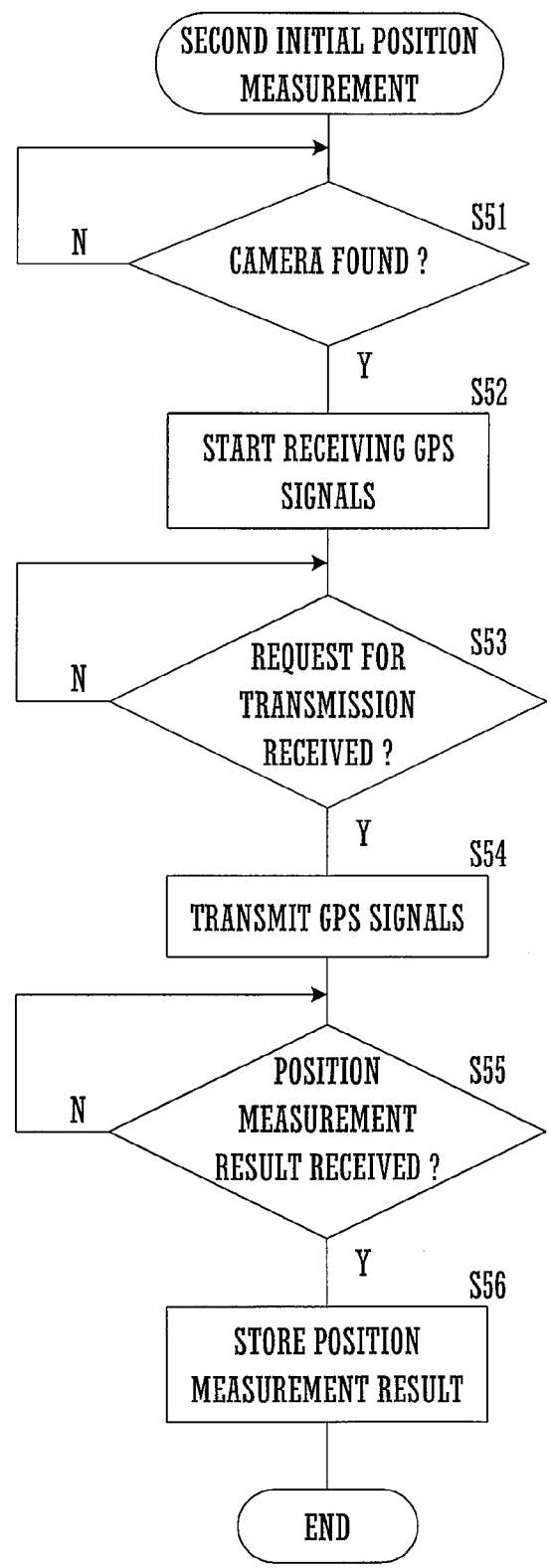
FIG. 7 is a flow chart showing a second initial position measurement by this mobile telephone of the position measurement system of this embodiment.

Next, the operation performed by the mobile telephone 1 for the second initial position measurement in the step S3 will be explained in detail. FIG. 7 is a flow chart showing the flow of control for this second initial position measurement. The mobile telephone 1 searches for a digital camera 2 of a type in cooperation with which it can perform position measurement of its own position (a step S51). This processing in the step S51 is the same as the processing in the step S4 described above. When in the step S51 the mobile telephone 1 detects a digital camera 2 of a type in cooperation with which it can perform position measurement of its own position, then it starts to receive the GPS signals which are being emitted by the GPS satellites 3 with the GPS reception unit 12 (a step S52). In this step S52, the GPS signals are received at a predetermined time intervals determined in advance. When the mobile telephone 1 receives a request for transmission of these GPS signals from the digital camera 2 (a step S53), it transmits the newest GPS signals to the digital camera 2 (a step S54). In this step S54, the mobile telephone 1 transmits the GPS signals to the mobile telephone 2 by utilizing the short distance wireless communication unit 13. And when, after having transmitted the GPS signals in the step S54, the mobile telephone 1 receives from the digital camera 2, via the short distance wireless communication unit 13, the result of position measurement which indicates its own current position (a step S55), then it stores its own position based upon the position measurement result which it has thus received (a step S56), and then this processing terminates.

In this manner, with the position measurement system of this embodiment, it is possible for the mobile telephone 1 to perform position measurement of its own position in cooperation with the digital camera 2, even in a state in which communication with the center is not possible. Moreover, it is possible for the digital camera 2 to store a captured image in correspondence with the position in which this captured image was captured, and this can be helpful to the user for managing the capture images. Furthermore, as far as the timing of communication and position measurement and analysis is concerned, it would also be acceptable to arrange for this not to be performed periodically, but to be performed upon some actuation as a trigger, for example upon shutter actuation for photography.

Figure 8:
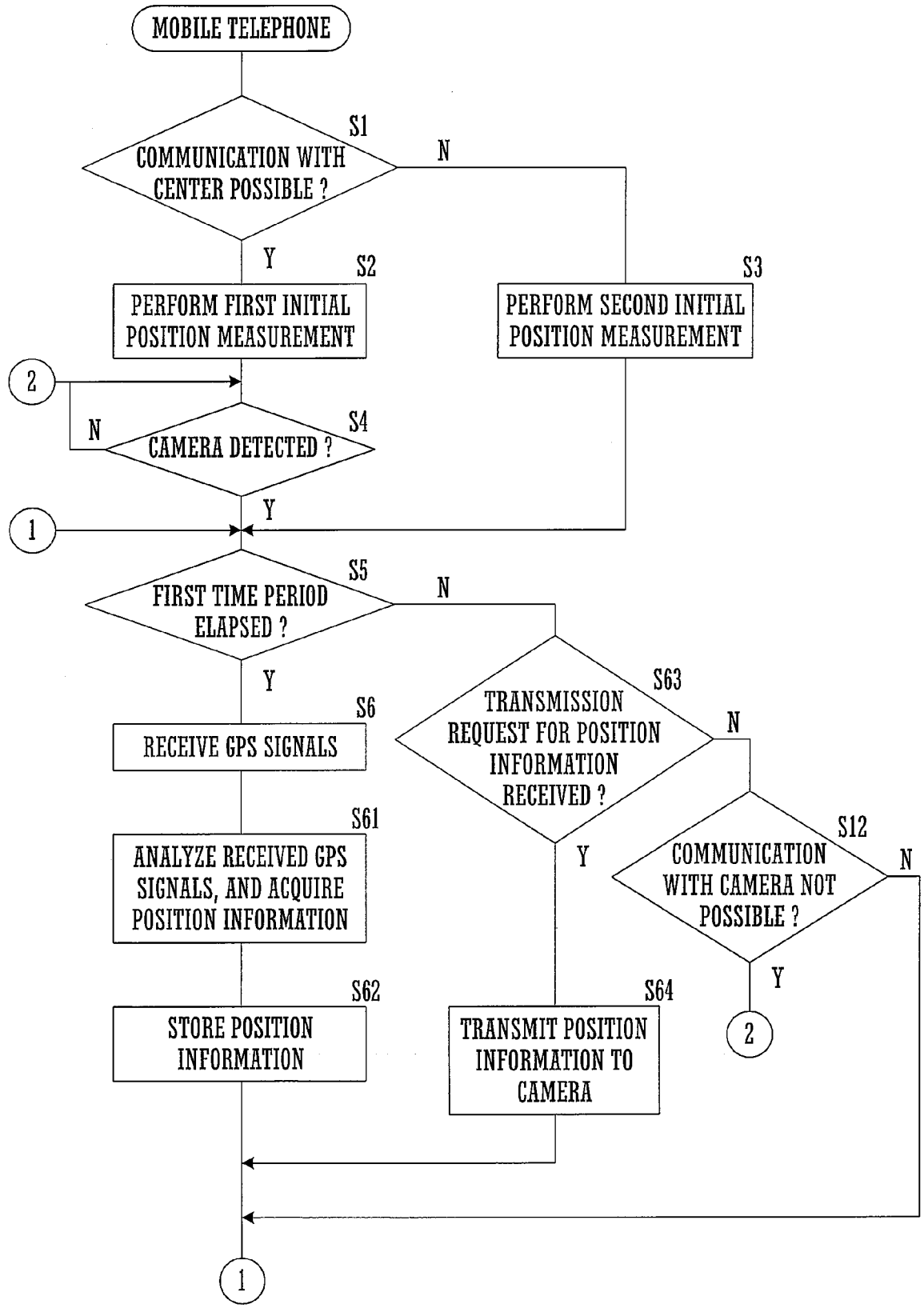
FIG. 8 is a flow chart showing the operation of a mobile telephone of a position measurement system of another embodiment in a third mode thereof.
Figure 9:
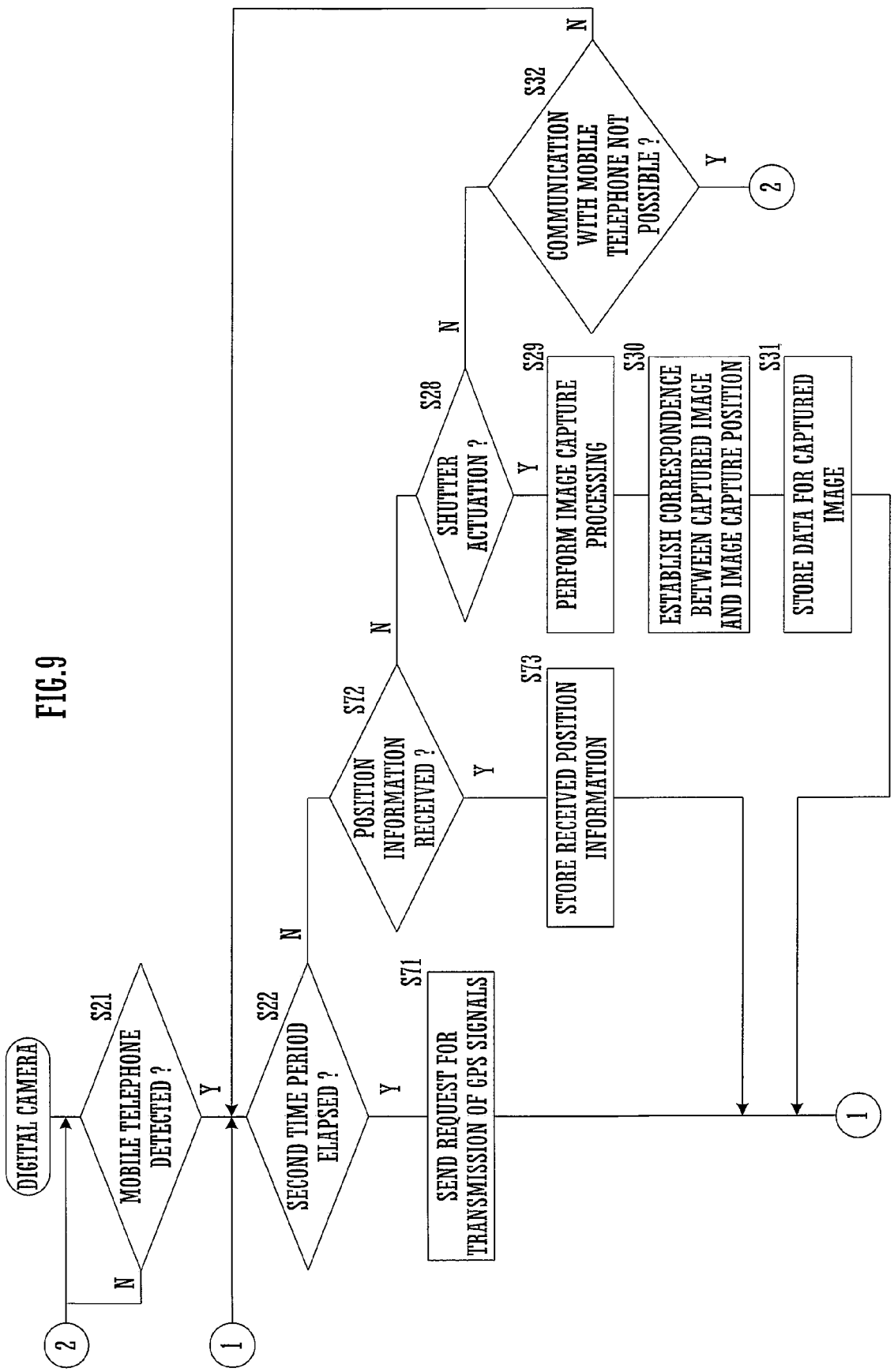
FIG. 9 is a flow chart showing the operation of a digital camera of the position measurement system of this other embodiment in a B mode thereof.

Next, another embodiment of the present invention will be explained. This embodiment differs from the embodiment described above in the aspect that the mobile telephone 1 is of an MS-Based type. In other words, this mobile telephone 1 is able to perform position measurement of its own position from GPS signals which it has received, provided that it is able to acquire adequate ephemeris data. FIG. 8 is a flow chart showing the operation of this mobile telephone 1 of the position measurement system of this other embodiment in its third mode, and FIG. 9 is a flow chart showing the operation of a digital camera 2 of the position measurement system of this other embodiment in its B mode.

It should be understood that since, just as in the case of the embodiment described above, the operation of this mobile telephone 1 in its first mode and in its second mode are the same as in the case of a per se known mobile telephone, accordingly explanation thereof will herein be omitted; and similarly since, just as in the case of the embodiment described above, the operation of this digital camera 2 in its A mode is the same as in the case of a per se known digital camera, accordingly explanation thereof will herein be omitted. Furthermore, in FIG. 8, the same step numbers are allocated to steps which consist of the same processing as in FIG. 4; and, similarly, in FIG. 9, the same step numbers are allocated to steps which consist of the same processing as in FIG. 5.

When actuation of the mobile telephone 1 to change it over to its third mode is performed upon the actuation unit 15, then the processing shown in FIG. 8 is started. And when, during the execution of the processing shown in FIG. 8, actuation of the mobile telephone 1 to change it over to some other mode is performed upon the actuation unit 15, then the processing shown in FIG. 8 is stopped, and operation in the mode to which changing over has been performed is started. Furthermore, when actuation of the digital camera 2 to change it over to its B mode is performed upon the actuation unit 25, then the processing shown in FIG. 9 is started. And, when during the execution of the processing shown in FIG. 9, actuation of the digital camera 2 to change it over to some other mode is performed upon the actuation unit 25, then the processing shown in FIG. 9 is stopped, and operation in the mode to which changing over has been performed is started.

When its operation in its third mode starts, the mobile telephone 1 first, initially, performs the processing described in the steps S1 through S4 shown in FIG. 4, and thereafter starts processing to receive the GPS signals emitted by the GPS satellites 3, every time a first time period which has been determined in advance elapses (steps S5 and S6). When the mobile telephone 1 receives the GPS signals in the step S6, it analyzes these received GPS signals, and acquires position information specifying its own position (a step S61). And the mobile telephone 1 stores this information specifying its own position, which it has thus acquired, in a memory provided to the control unit 10, not shown in the figures (a step S62). Moreover when, during the execution of the processing in these steps S5, S6, S61, and S62, the mobile telephone 1 receives via the short distance wireless communication unit 13 a transmission request for the position information from the digital camera 2, it transmits the most recent position information stored in the memory to the digital camera 2 from which this transmission request has been transmitted (steps S63 and S64). This reception of the position information transmission request and transmission of the position information are performed via the short distance wireless communication unit 13. Furthermore, the above described flow of control returns to the step S4 and repeats the processing described above, until a state comes to hold in which the mobile telephone 1 is not able to perform short distance communication with the digital camera 2 via the short distance wireless communication unit 13.

It should be understood that, with the mobile telephone 1 of this embodiment, the processing described in the steps S10 and S11 shown in FIG. 4 is not performed. Furthermore, just as in the case of the first embodiment described above, when the mobile telephone 1 of this embodiment is operating in its third mode, it is also able to perform communication with other terminals upon the mobile telephone network via the mobile telephone communication unit 11. Moreover, if actuation is performed via the actuation unit 15 to change the mobile telephone 1 over to some other mode, or if actuation is performed to turn OFF the power supply to the mobile telephone 1 or the like, then the processing shown in this FIG. 8 terminates, and operation in the mode to which changeover has been performed is started.

Next, the operation of the digital camera 2 in its B mode will be explained with reference to FIG. 9. When the digital camera 2 starts its operation in its B mode, it performs the processing described in the step S21 for the case of the first embodiment described above. Similarly, this digital camera 2 of this embodiment also acquires the position of the mobile telephone 1, which it considers as being substantially its own position. When the digital camera 2 detects in this step S21 a mobile telephone 1 of a type in cooperation with which it can perform position measurement of its own position, then via the short distance wireless communication unit 26 it repeatedly requests the mobile telephone 1 to transmit position information, at intervals of a second time period which is determined in advance (steps S22 and S71). This second time period may be set to be the same time period as the first time period described above, or also may be a different time period. The mobile telephone 1 receives the request for transmission of position information which has been outputted by the digital camera 2 in this step S71, in the step S63 described above.

Furthermore when, while the digital camera 2 is executing the processing of the steps S22 and S71, it receives via the short distance wireless communication unit 26 the position information which has been transmitted from the mobile telephone 1 (a step S72), then it stores this position information which it has received in the memory of the control unit 20 (a step S73). In other words, the digital camera 2 stores the position specified by the position information which has been transmitted from the mobile telephone 1, as its own position.

Furthermore, when the shutter button (not shown in the figures) which is provided to the actuation unit 25 is actuated (a step S28), then the digital camera 2 performs the same processing as described above in the steps S29 through S31 with respect to the first embodiment, and, if a state comes to hold in which the digital camera 2 is not able to perform short distance wireless communication with the mobile telephone 1 via the short distance wireless communication unit 26 (a step S32), then the flow of control returns to the step S21 and the processing described above is repeated.

It should be understood that if actuation is performed via the actuation unit 25 to change the digital camera 2 over to some other mode, or if actuation is performed to turn OFF the power supply to the digital camera 2 or the like, then the processing shown in this FIG. 9 terminates, and operation in the mode to which changeover has been performed is started.

Figure 10:
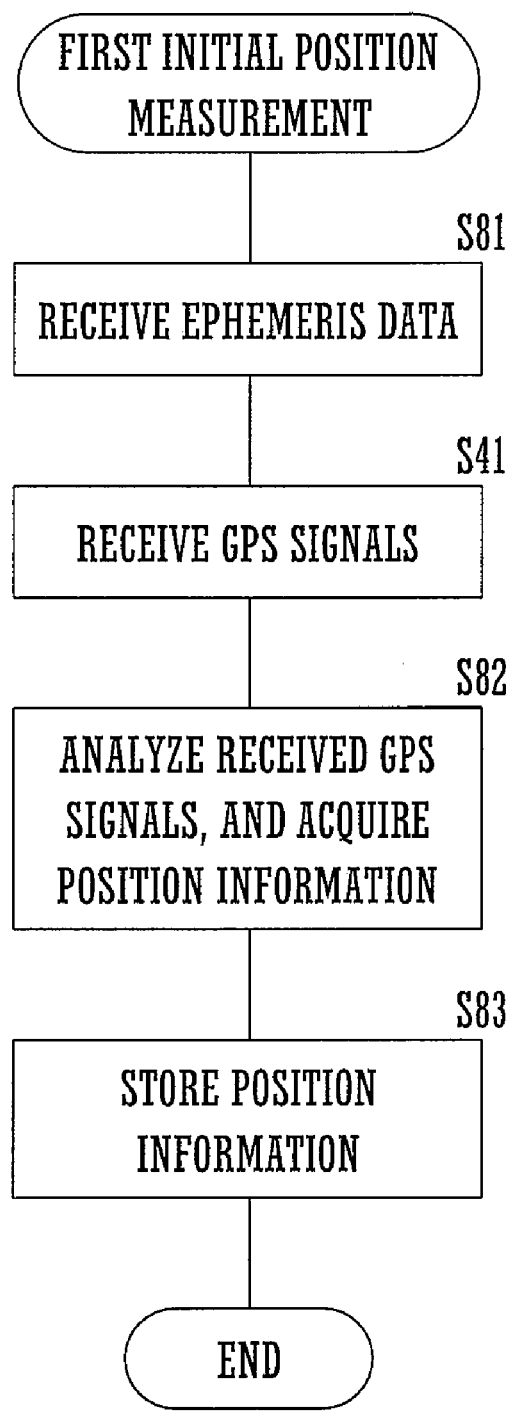
FIG. 10 is a flow chart showing a first initial position measurement by this mobile telephone of the position measurement system of this other embodiment.

Next, the operation performed by the mobile telephone 1 for the first initial position measurement in the step S2 will be explained in detail. FIG. 10 is a flow chart showing the flow of control for this first initial position measurement. In FIG. 10, the same step numbers are allocated to steps which consist of the same processing as in FIG. 6. The mobile telephone 1 receives ephemeris data from the center (a step S81). In this step S81, the mobile telephone 1 acquires this ephemeris data by communicating with the center by taking advantage of the mobile telephone communication unit 11. And the mobile telephone 1 receives GPS signals which are emitted from the GPS satellites 3 with the GPS reception unit 12 (a step S41), and analyzes these GPS signals which it has received this time using the ephemeris data which it has acquired in the step S81, thereby acquiring position information which indicates its own position (a step S82). The mobile telephone 1 then stores its own position (a step S83) based upon this position information which it has thus acquired in the step S82, and then this processing ends.

Figure 11:
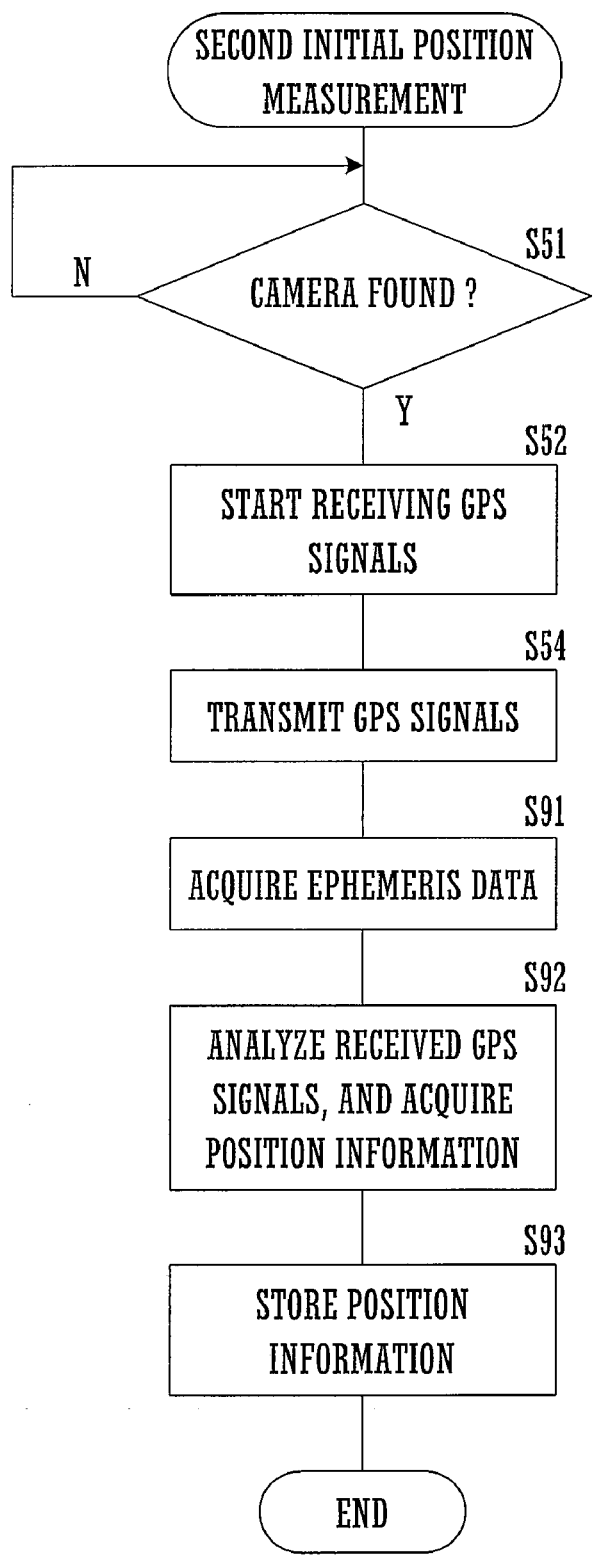
FIG. 11 is a flow chart showing a second initial position measurement by this mobile telephone of the position measurement system of this other embodiment.

Next, the operation performed by the mobile telephone 1 for the second initial position measurement in the step S3 will be explained in detail. FIG. 11 is a flow chart showing the flow of control for this second initial position measurement. In FIG. 11, the same step numbers are allocated to steps which consist of the same processing as in FIG. 7. Via the short distance wireless communication unit 13, the mobile telephone 1 detects the digital camera 2 in cooperation with which it is possible to perform position measurement of its own position, and then starts to receive the GPS which are emitted from the GPS satellites 3 with the GPS reception unit 12 (steps S51 and S52). Furthermore, it transmits the GPS signals which it has received to the digital camera 2 (a step S54), and acquires the ephemeris data from this digital camera 2 (a step S91). And the digital camera 2 transmits to the mobile telephone 1 the ephemeris data which it has acquired from the GPS signals which have been transmitted from the mobile telephone 1. The mobile telephone 1 then analyzes the GPS signals which it has received this time using the ephemeris data acquired in the step S91, and acquires position information specifying its own position (a step S92). The mobile telephone 1 then stores (a step S93) the position information which it has acquired in the step S92, and then this processing ends.

In this manner, with the position measurement system of this embodiment as well, it is possible for the mobile telephone 1 to perform position measurement of its own position in cooperation with the digital camera 2. Moreover, it is possible for the digital camera 2 to store a captured image in correspondence with the position in which this captured image was captured, and this can be helpful to the user for managing the capture images. Furthermore, as far as the timing of communication and position measurement and analysis is concerned, it would also be acceptable to arrange for this not to be performed periodically, but to be performed upon some actuation as a trigger, for example upon shutter actuation for photography.

It should be understood that, in the above described explanation of embodiments of the present invention, all of the features are shown by way of example, and should not be considered as being limitative of the present invention. The scope of the present invention is not to be defined by any of the features of the embodiment described above, but only by the scope of the appended Claims. Moreover, equivalents to elements in the Claims, and variations within their legitimate and proper scope, are also to be considered as being included within the range of the present invention.

What is claimed is:

1. A position measurement system comprising first and second portable terminals which comprise short distance wireless communication means for performing short distance wireless communication, and which performs position measurement using a signal transmitted from a satellite via radio waves, wherein:
   the first portable terminal comprises:
      signal reception means which receives a signal transmitted from a satellite via radio waves;
      signal transfer means which transfers the signal received by the signal reception means to the second portable terminal using the short distance wireless communication means; and
      mobile telephone communication means which performs communication with other terminals via a mobile telephone network; and
   the second portable terminal comprises:
      position measurement means which, when the signal which has been transmitted by the signal transfer means of the first portable terminal has been received by the short distance wireless communication means, measures the position of the first portable terminal based upon the received signal;
      position measurement result notification means which notifies the position of the first portable terminal which has been measured by the position measurement means to the first portable terminal, using the short distance wireless communication means;
      image capture means which captures an image of an image capture area; and
      captured image storage means which stores a captured image of an image capture area which has been captured by the image capture means, and the position of the first portable terminal which has been measured by the position measurement means directly before the capturing of the captured image, in mutual correspondence.

2. A position measurement system comprising first and second portable terminals which comprise short distance wireless communication means for performing short distance wireless communication, and which performs position measurement using a signal transmitted from a satellite via radio waves, wherein:
   the first portable terminal comprises:
      signal reception means which receives a signal transmitted from a satellite via radio waves;
      position measurement means which measures its own position, based upon the signal received by the signal reception means; and
      position measurement result notification means which notifies its own position, which has been measured by the position measurement means, to the second portable terminal, using the short distance wireless communication means; and
   the second portable terminal comprises:
      storage means which stores the position of the first portable terminal which has been notified by the position measurement result notification means of the first portable terminal, via the short distance wireless communication means;
      image capture means which captures an image of an image capture area; and
      captured image storage means which stores a captured image of an image capture area which has been captured by the image capture means, and the position of the first portable terminal which has been stored by the storage means, in mutual correspondence.

3. A position measurement system according to claim 2, wherein the first portable terminal further comprises mobile telephone communication means which performs communication with other terminals via a mobile telephone network.

4. A portable terminal, comprising:
   short distance wireless communication means which performs short distance wireless communication;
   signal acquisition means which acquires, by using the short distance wireless communication means, a signal from another portable terminal which comprises a signal reception means which receives a signal transmitted from a satellite via radio waves;
   position measurement means which, based upon the signal which has been acquired by the signal acquisition means, measures the position of the other portable terminal from which the signal has been transmitted;
   position measurement result notification means which notifies, to the other portable terminal, using the short distance wireless communication means, the position of the other portable terminal as measured by the position measurement means;
   image capture means which captures an image of an image capture area; and
   captured image storage means which stores a captured image of an image capture area which has been captured by the image capture means, and the position of the other portable terminal which has been measured by the position measurement means directly previously, in mutual correspondence.

* * * * *